United States Patent [19]
Maji et al.

[11] Patent Number: 5,178,582
[45] Date of Patent: Jan. 12, 1993

[54] ELECTROMAGNETIC POWDER COUPLING DEVICE

[75] Inventors: Hiroshi Maji; Hiroyoshi Yamaji, both of Mie; Hidehisa Tuji, Ise, all of Japan

[73] Assignee: Shinko Denki Kabushiki Kaisha, Tokyo, Japan

[21] Appl. No.: 706,335

[22] Filed: May 28, 1991

[30] Foreign Application Priority Data

May 31, 1990 [JP] Japan .................... 2-56441[U]
May 31, 1990 [JP] Japan .................... 2-56442[U]

[51] Int. Cl.⁵ ............................................. F16D 27/00
[52] U.S. Cl. .................... 464/17; 188/264 A; 188/267; 192/21.5; 464/29
[58] Field of Search ............ 464/29, 17; 188/267, 188/264 A; 192/21.5, 113 A

[56] References Cited

U.S. PATENT DOCUMENTS

| | | | |
|---|---|---|---|
| 3,002,597 | 10/1961 | Warman et al. | 192/113 A |
| 3,581,855 | 6/1971 | Taeffner | 192/113 A X |
| 3,945,476 | 3/1976 | de Jong | 192/113 A X |
| 4,085,344 | 4/1978 | Eddens | 192/113 A X |
| 4,895,233 | 1/1990 | Inoue et al. | 192/113 A X |

FOREIGN PATENT DOCUMENTS

| | | |
|---|---|---|
| 1046420 | 12/1958 | Fed. Rep. of Germany . |
| 1543335 | 9/1968 | France . |
| 56-26106 | 6/1981 | Japan . |
| 60-129434 | 7/1985 | Japan . |
| 61-17537 | 2/1986 | Japan . |

*Primary Examiner*—Daniel P. Stodola
*Assistant Examiner*—Tony A. Gayoso
*Attorney, Agent, or Firm*—Oblon, Spivak, McClelland, Maier & Neustadt

[57] ABSTRACT

An electromagnetic powder coupling device which can be used either as a brake or a clutch. In order to remove undesirable heat in the device, one attributable to Joule heat mainly emanated by field member, a rotor and a cylinder, and to other to frictional heat, especially inevitable for this kind of electromagnetic powder coupling device which is emanated by the friction between the rotor, cylinder and the magnetic powder filled in the space between the cylinder and the rotor, the coupling device incorporates a forced air draft cooling system. Two variations of cooling systems are disclosed, both of which have, in common with, at least a blower and a plurality of passages for forced draft air cooling not only to the external part but also to the inner part of the field member and the cylinder.

4 Claims, 3 Drawing Sheets

ELECTROMAGNETIC POWDER COUPLING DEVICE

BACKGROUND OF THE INVENTION

1. Field of the Invention

The present invention generally relates to an electromagnetic powder coupling device, and more particularly to a cooling system applicable to an electromagnetic powder coupling devices including a clutch and or a brake.

2. Prior Art

Major components of the general type industrial electromagnetic powder coupling device consisting of, a field assembly incorporating therein a magnetic coil, a driving clutch referred to a cylinder, a rotor as a driven clutch member and magnetic powder, merely referred to "powder" being filled in a gap defined between the cylinder as a driving clutch and a driven clutch, which gap is usually referred to as an actuating gap.

The following describes the general function of an electromagnetic powder coupling device with reference to FIG. 1.

When a cylinder 5 is rotated being driven by an external driving shaft or by an attached driving shaft 4 with the coil 8 of a field member 9 without being excited, the powder in the gap is urged by centrifugal force against the inner wall of the cylinder 5, and thus an annular space is formed between the coalesced surface of the magnetic powder and a rotor 10. As a result no appreciable amount of torque can be formed under this state of non-contact between the powder and the rotor 10 which are spaced apart.

On the other hand, when the field coil 8 is excited, a closed path of magnetic flux $\phi$ is established as shown by a dash line in FIG. 1.

Field member→Cylinder→Rotor→Cylinder→Field member.

Then the magnetic powder aligns in the gap along the path of the magnetic flux $\phi$ in the assembly and couples the cylinder 5 with the rotor 10, thereby the driving force can be transmitted from the cylinder 5 to the rotor by virtue of the shear resistance of the magnetic powder.

Since FIG. 1 is shown as an electromagnetic powder brake the rotor 10 is fixed stationary by a fixed rotor boss 10c, however, if this coupling device is to be used as a clutch, the rotor 10 is connected to an output shaft(-not shown)which can be rotatable integral with the rotor 10.

Because of the fact that it utilizes magnetic powder as a power transmitting medium and thus the coupling devices of this kind have such feature as capable of imparting constant torque even under slipping conditions which other coupling means cannot satisfy, it can be operated with stable control under continued slipping(slippage), however, it has been deemed that the most important problems to be solved is how to cool and remove the heat generated by the aforesaid continued slipping which is not encountered in any other friction disc type coupling means.

In view of the above-mentioned problem, there have been proposed a number of cooling systems up to the present, such as water coolled, natural cooling and forced draft air cooling using an air blower or blowers, among which the water cooling has been found to be most satisfactory so far as its cooling efficiency is concerned, however, it has found to have several drawbacks such as troublesome work in piping, leakage of water in use and the related parts of the device are liable to be dewed.

As a measure to solve the drawbacks encountered in the water cooling system of the prior art as mentioned above, the natural cooling means as shown in FIG. 1 has been proposed as a typical one, which radiates(dissipates) both frictional heat and Joule heat generated by a rotor 10 and a cylinder 5 through the surfaces of a bracket 2 and a bracket 3 contacting the outer atmosphere, and also dissipates the Joule heat generated by the field 9 through the surface of the field 9.

Shown in FIG. 2 is a forced air draft type cooling means adopted in an electromagnetic powder brake capable of cooling its field member 9 and brackets 22 for holding the field member 9 and having no such appreciable drawbacks as found in the water cooling system as mentioned above.

As shown in FIG. 2, the cooling means comprises, a blower 1 attached to the bracket 22 disposed at the output side of the coupling device, and cooling fins 5a supported by a side plate 26 and are rotatable integral with the input shaft 4 and positioned axially outside the cylinder 5 and at the portion between the blower 1 and the cylinder 5.

As would be readily recongnized by one skilled in the art, in FIG. 2, numeral 20c denotes a fixed rotor boss for stationarily fixing the rotor 20. The rotor boss 20c carries a labrinth ring 20d, which coacts with another labyrinth ring 26a slantedly stemming out from the side plate 26. The labyrinth rings 20d and 26a are thus disposed to act as a pair to prevent magnetic powders in and near the upper part of the gap between the cylinder 5 and the rotor 20 from leaking outward when the field member 9 is not energized. Rather, the labyrinth ring arrangement guides the powders to enter into the opposite lower part of the gap, by guiding the powders to flow downward through two circumferential paths defined by the pair of labyrinth rings 20d and 26a.

The cooling means further comprises a heat pipe 20a of highly heat conductive material and including a cooling fin 20b which is secured to and being in tight contact with the rotor 20 at its axially central portion and axially extends toward the outlet of aforesaid blower 1.

Numeral 4 disposed at the input side is an input shaft 4 which usually is an external driving shaft to be connected at the user's site.

The cylinder 5 is fixed to the input shaft 4 through a side plate 7 and being spaced apart at a gap of specified extent from the outer periphery of the rotor 20.

As can be seen from FIG. 1, such cooling system which dissipates heat generated by means of heat conduction through the contact with air at the surface or surfaces of the brackets at both axial ends and the surface of the field member, is no more than a natural cooling. As a result, the cooling effect of such a cooling system cannot be expected to be high enough and the efficiency in slippage also becomes low, which giving rise to a low allowable capacity limit as compared with those of a water cooled system.

As to the forced draft cooling system shown in FIG. 2, constituting members effective for cooling are the heat pipe 20a and fin 20b for cooling the rotor 20 and the bracket 22, and the fin 5a for cooling the cylinder 5, therefore, the cooling air from the blower 1 flows, as a uniflow type of stream K, passing through the fin 20b then flows somewhat slantedly in radial direction outwards, as a consequence, the heat generated at the actuating part of the coupling device is transmitted to the field member 9 through the bracket 22. In addition, Joule heat generated at the coil is also added to the field member 9, then the cooling power also becomes insufficient and thus results in lower slip efficiency as compared with that obtainable by the water cooled system.

SUMMARY OF THE INVENTION

By taking the aforesaid drawbacks in the conventional cooling system into consideration, the present invention aims to obviate such drawbacks and to provide two types of improved cooling systems.

Accordingly, an object of the present invention is to strengthen the cooling effect of the prior art coupling device which has relied only on natural cooling as shown in FIG. 1, in which the effect of cooling was found to be not sufficient.

Another object of the present invention is to improve the forced draft cooling system of the prior art now being effected by a blower disposed at the output side of the device and cools only the exterior of the field member, as shown in FIG. 2.

Technical concept in common with two types of such improved cooling means as aimed is to use at least a blower and to provide a plurality of air passages, which allow the air from the blower or blowers to flow by taking a plurality of paths at least one of which passes through the interior part of or at least the vicinity of the cylinder member, and thereby the inner part of the coupling device can be cooled throughout its entire length, from one axial end to the other end, in addition to the cooling only for the exterior part of the device as the prior art cooling means did, that is, only for the outer part of the field member and the brackets which support the field member.

As to the mode of flow of cooling air, the cooling system of the present invention also can be classified into two types, corresponding to the two types of prior art cooling means, namely, one for improving natural cooling system shown in FIG. 1, and the other for improving the forced draft cooling system shown in FIG. 2.

In the former one, cooling air is radially blown into the inner part of the device from the blower or blowers disposed around the outer peripheral wall of the coupling device and then flows out axially toward both axial ends, and in the latter type cooling means, the air axially blown by a blower disposed at the output side axial end is divided at the beginning into two types of streams and eventually into three streams, that is, an outer slanted first stream, an intermediate second slanted stream and an interior axial third stream which stems out from the second stream, then passing through the paths formed between the cylinder and the field member and then flowing out through exit vents opened through the bracket at the input side.

The above and further objects and novel features of the present invention will be apparent from a reading of the following description of the disclosure and shown in the accompanying drawings and the novelty thereof pointed out in the appended claims.

Explanation will now be made on the detailed structure of the present invention by referring to the accompanying drawings.

DETAILED DESCRIPTION OF THE PREFERRED EMBODIMENTS

First Embodiment

Figure 1:
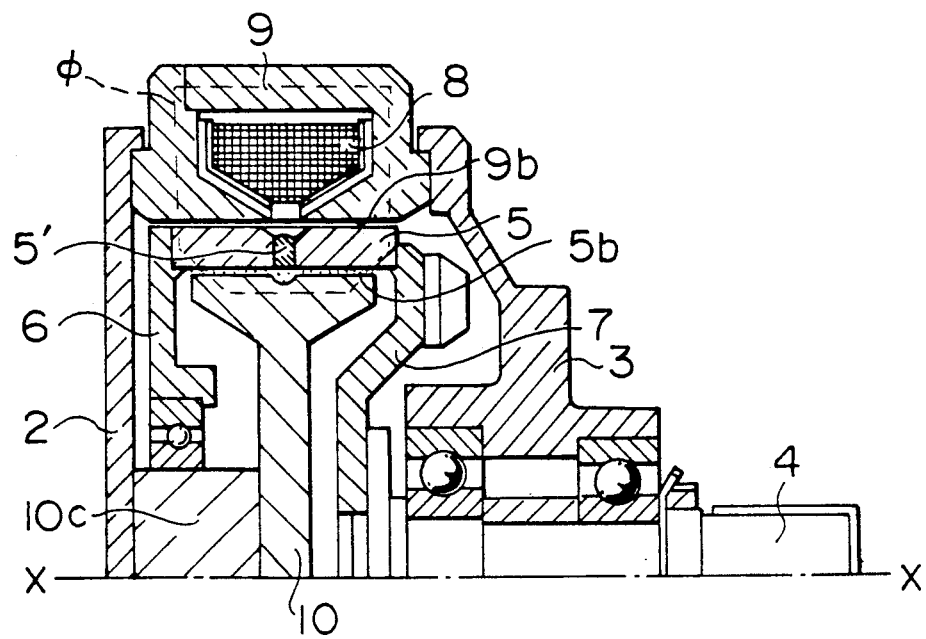
FIG. 1 is a half cut cross-sectional front view showing an electromagnetic powder brake of a prior art type using natural cooling system.
Figure 2:
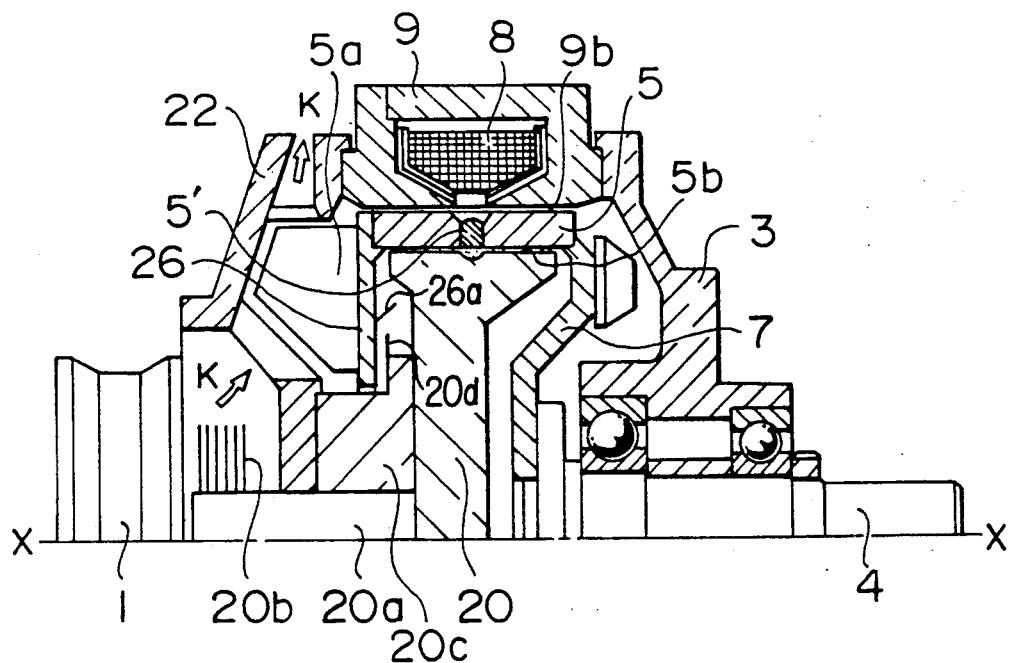
FIG. 2 is a half cut cross-sectional front view showing an electromagnetic powder brake of another type prior art one using forced draft cooling system.
Figure 3:
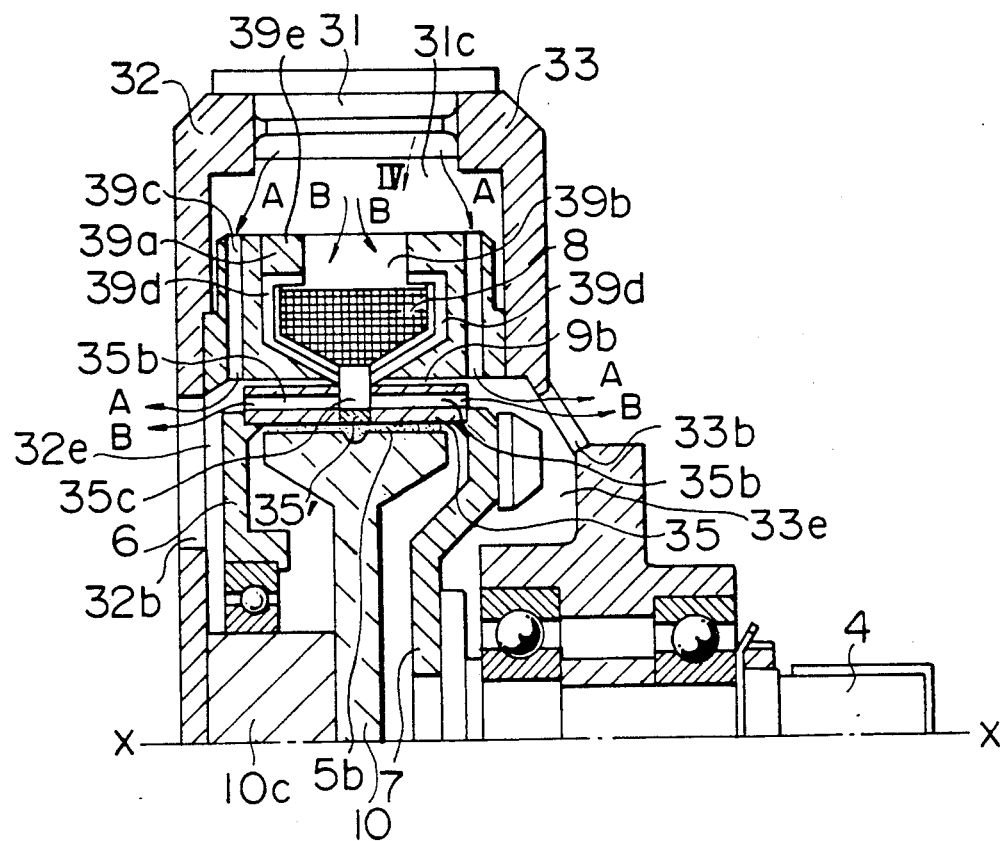
FIG. 3 is a half cut cross-sectional front view showing an electromagnetic powder coupling device according to the first Embodiment of the present invention.
Figure 4:
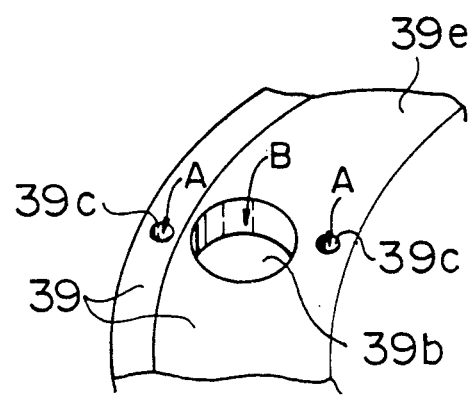
FIG. 4 is an enlarged perspective partial view taken along arrow mark IV of FIG. 3.

Referring now to FIGS. 3 and 4, one or more blowers 1 incorporating therein a driving means such as a motor (not shown) are disposed on the radially outer periphery defined by brackets 32 and 33.

Brackets 32 and 33 for supporting a hollow cylinder 35, each one of which is attached to each opposite axial end of the coupling device, are radially and outwardly extended, and a top plate, namely, an outer peripheral wall connecting the radially outer ends of the thus extended two brackets 32 and 33, is provided.

A top cover 39e covering the inner chamber which houses the coil assembly 8, is radially passed through by one or plural groups of vent channels. Each channel consists of one vent opening 39b of large diameter opened at the axially central part of the top cover 39e and a pair of small vents 39c each one at each axial ends of the top cover 39e.

The vent opening 39b is opened through the top cover 39e so that it can be in communication with the inner part of the field member 39 through at least a pair of vent grooves 39d, each formed axially in the coil member 8 at a suitable portion of the coil assembly 8 such as in the coil bobbin or on the inner surface of the yoke of the field assembly 39 and takes a somewhat complicated path along the outer surface of the coil at both axial sides the vent grooves 39d are then directed slantedly and axially inward to a ring 35' for shielding magnetic flux(hereafter merely referred to shielding ring)which acts to prevent magnetic flux from taking a short cut path through the cylinder 35, which will be explained later.

The pair of small vents 39c each opened near each axial end of the top cover 39e, runs straight radially inward toward the inner end of the field member 39 and toward the axial end of the cylinder 35. The inlet of these three channels as seen on the top cover 39e, that is, the vent opening 39b and the pair of small vents 39c, are in alignment with each other in an axial direction.

The cylinder 35 generally of a hollow cylindrical shape is formed with at least one, preferably with a plurality of axially opened vent passages 35b circumferentially spaced apart as holes or sectored apertures each axially passing through the peripheral wall of the cylinder 35.

The shielding rings 35' inserted radially at the axial central part of the cylinder is partly cut away to such an extent that they constitute plural vent recesses 35c each of which intersects aforesaid axially opened vent passages 35b of the cylinder 35 so that each of the vent passages 35b can communicate with the pair of vent grooves 39d and finally with the air space 31c defined at the outlet of the blower 31.

Since the vent passages 35b are opened through the peripheral wall of the cylinder 5 and each axial end of the vent passage 35b confronts the side wall of the brackets 32 and 33 at each axial side of the coupling device, and each side wall of the brackets 32 and 33 is opened to have a through hole as an exit vent 32b or 33b in communication with the spaces 32e and 33e, respectively, formed between the side plate 6 and the bracket 32 itself, and similarly between the side plate 7 and the bracket 33 itself. Thus each of the exit vents 32b and 33b can communicate with the small vents 39c at either axial end of the field member 9 and eventually with the air draft coming from the blower 31.

On the other hand, each of the aforesaid vent opening 39b at the central part of the top cover 39e of the field member 39 can be in communication with either one of the exit vent 32b or 33b by flowing through either one half axial part of the vent passage 35b.

Now, operation of the cooling means according to the first embodiment will be explained.

To make the manner of the air flow more clear, the following explanation will be made with respect to only one blower in the coupling device, related vent channels consisting of a number of various types of openings provided for passing the cooling air blown from the blower 31.

The air radially blown from each blower 31 is divided into three radial streams all passing through the field member 39, namely, a main central stream B which flows by passing through the central vent opening 39b of the field member and two branch side streams A each of them also radially passes through the pair of small vents 39c opened near the opposite axial ends of the field member 39.

The air blown into the vent opening 39b as a main stream B flows through the vent opening 39b, then the air flow is divided into two radial streams each flowing through two somewhat winding paths along the outer surface of the coil assembly and to the central part of the radially inner part of the field member where the shielding ring 35' is disposed.

The air flows through the winding recesses along the both outer marginal surfaces of the coil assembly merges again into a single stream, in the vent recess 35c of the drilled part of the shielding ring 35', but the air having passed through the vent recess 35c is immediately divided again into two axial streams, one directed to the input side and the other to the output side, and each flows axially through each of the two half parts of the vent passage 35b down to the outlet. At the outlet, the cooling air flowing through the vent passage 35b in two opposite direction is allowed to exit outside from each of the exit vent 32b and 33b opened through each side wall of the brackets at both sides.

As explained above, the air cooling system according to the first embodiment can be readily accomplished by radially extending brackets at both axial ends and providing one or more blowers on the peripheral wall of the thus extended brackets and by forming a plurality of vent channels which can be classified into two paths, a first one of a central path comprising vent opening 39b, vent grooves 39d, vent recess 35c and vent passage 35b, thereby allowing the air blown from the blower to flow as a central stream B flowing radially through the central part and then takes two axial flows toward the exit vents at both axial ends, and a second branch path passing through both the axial end of the field member and directly toward the vent gates and allows the blown air to flow as a second stream A.

As a consequence, Joule heat at the field member, frictional heat combined with Joule heat at the cylinder and the rotor can be effectively removed without being accompanied by any problems such as in piping work, water leakage and dew forming found in the water cooling system.

SECOND EMBODIMENT OF THE INVENTION

Figure 5:
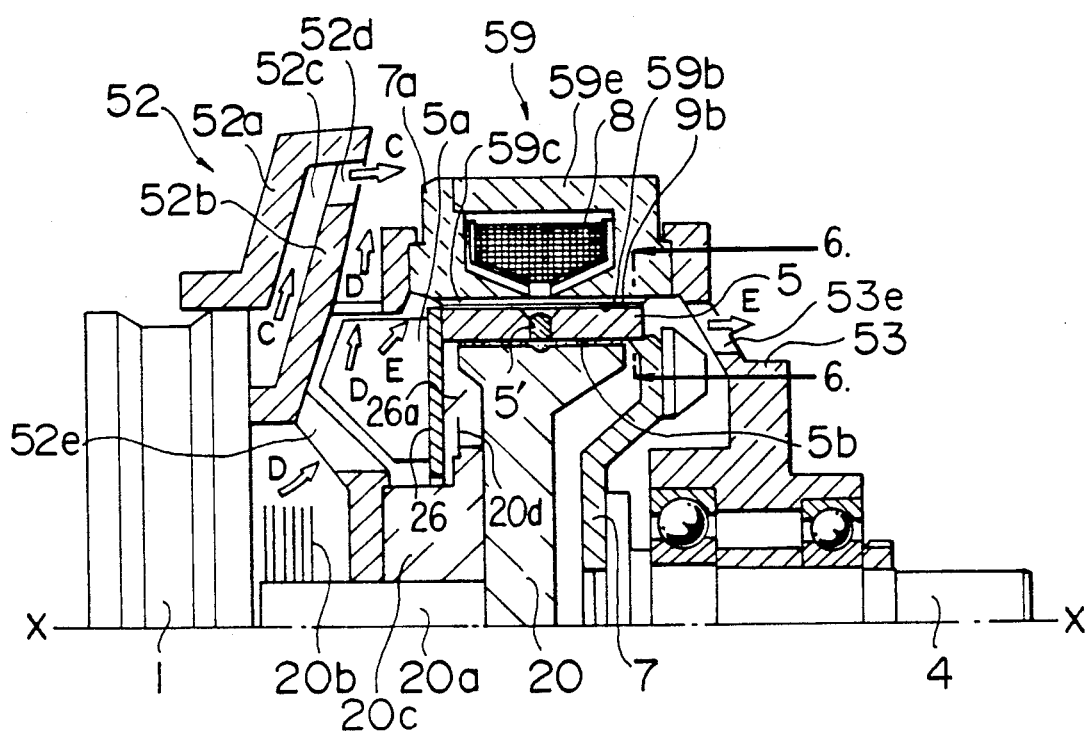
FIG. 5 is a half cut cross-sectional front view showing an electromagnetic powder coupling device according to the second Embodiment of the present invention.
Figure 6:
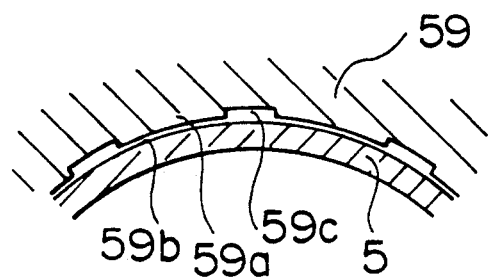
FIG. 6 is an enlarged cross-sectional view taken along line VI—VI of FIG. 5.

FIG. 5 is a half cut sectional front view showing the second embodiment of the cooling system of this invention applied to the electromagnetic powder coupling device, and FIG. 6 is an enlarged cross sectional view taken along arrow lines VI—VI of FIG. 5.

A bracket 52 disposed at the output side is formed as a double-walled type one having, a slantedly extending annular outer wall 52a and a slantedly extending annular inner wall 52b extending parallel to the outer wall 52a, and at least an annular air passage 52c is defined between the outer wall 52a and the inner wall 52b which forms a path for a branch stream C for the air blown by the blower 1 and allows it to flow slantedly and radially outside the coupling device.

The outlet opening 52d of the air passage is turned parallel to the axis line X—X so that the flow of the cooling air as the stream C is directed to the outer surface of the field member 59 of the electromagnetic powder coupling device according to the second embodiment of the present invention.

Another stream D of the cooling air passes through a radially intermediate path along the cooling fins 20b and the next fin 5a, where the stream D is divided into two streams, that is, the main original stream D having slant-ed-ly passed through the space between the inner surface of the inner wall 52b and the outer surface of the field member 59, and a branch stream E which axially flows in parallel with the axis X—X passing mainly through grooves 59c cut on the inner surface 59b of the yoke 59 and partly through the fine gaps between the lands 59a and the cylinder 5 as paticularly shown in FIG. 6.

The branch stream E which having passed through the grooves 59c and the fine gaps, flows further to exit vent 53e opened through a bracket 53 at the input side and at a portion corresponding to the grooves 59c and the cylinder 5 of the coupling device, and then flows out. Thus the branch stream E, can effectively cool the inner part of the field member 59, the outer part of the cylinder 5 and the bracket 53 during its travel of flowing, while the main stream D flows radially and slantedly outward and cools the fin 5a after having cooled the rotor 20 through the heat pipe 20a and fins 20b, and then cools the outer part of the field member 59.

. By virtue of the structural feature of the first and the second Embodiments of the present invention, cooling for the electromagnetic powder coupling device can be rendered applicable not only to the outer part of the field member, but also to the radially inner part of the field member and the outer surface of the cylinder, thereby it becomes possible to obtain high slip efficiency equivalent to that can be attained by the water cooling system and to increase the limit of the allowable work and a wider range of use can be expected due to the fact that it is accompanied with no such troublesome piping work, water leakage nor dew formation as found in water cooling system.

What is claimed is:

1. An electromagnetic powder coupling device comprising, a bracket at an input side and another bracket at an output side of the device, respectively, a field member including a yoke and a coil assembly and being tightly received by both of said brackets at respective axial ends of the field member, a hollow cylinder coaxially disposed in the inner space of said field member being supported by a pair of side plates each disposed at each axial end of said cylinder so as to be rotatable integral with said drive shaft, a rotor disposed coaxially around the axis of rotation and axially between said side plates, an annular magnetic flux sheilding ring of non-magnetic material radially inserted through said cylinder substantially at the central part of said cylinder, and magnetic powder filled in a space between said cylinder and said rotor for effecting magnetic coupling between said cylinder and said rotor when said field member is excited, and releasing the magnetic coupling when said field member is not excited, and wherein the cooling of the heat generated by Joule heat and frictional heat emanated by the related parts of the coupling device is effected by natural cooling through the outer surface of the parts or component, wherein;

said bracket at each axial end is radially extended to such an extent that they can define at least an air space of sufficient inner volume, and wherein said coupling device further comprises:

at least a blower disposed at the radially outer peripheral end of said brackets for blowing a draft of cooling air toward said field member, a plurality of vent channels comprising at least two air paths formed through said field member, including a first path generally passing through the interior of said field member along the outer surfaces of the coil assembly at the axial ends both at the input side and the output side and extending slantedly toward the axial center of said cylinder, then passing axially through the interior of said cylinder in opposite directions toward said input side and output side, and a second path which radially passes through said field member at a location adjacent to the both axial ends at the input side and output side and flowing substantially straight down to the outlet opened at the reverse side of said field member adjacent to the outlets of said former path; and a pair of exit vents passing through each of said brackets at the input side and said output side and at a portion substantially corresponding to the outlets of said two paths at both axial sides, whereby the forced draft of cooling air by said blower can be allowed to flow by passing through said two paths and can then discharge outwards after having cooled the interior part and the exterior part of the electromagnetic powder coupling device.

2. An electromagnetic powder coupling device as claimed in claim 1, wherein said field member comprises;

at least a vent opening disposed at its axially central part and radially passing through the top plate of the field member for introducing a major part of said cooling air, at least a pair of vent grooves each formed at each axial end and along the outer surface of said coil assembly for passing said cooling air introduced through said vent opening radially inward and toward said magnetic flux shielding ring, a vent recess for each pair of vent grooves formed by removing a part of said magnetic flux shielding ring to such an extent that said cooling air having passed said vent grooves can flow up to said cylinder, at least a vent passage opened axially through said cylinder for dividing said flow of cooling air having passed through said vent recess into two axial streams of air flow in opposite directions toward the input side and the output side;

and wherein said second path comprises:

at least a pair of small vents each opened radially through said field member at a location near the axial end of said field member at the input side and the output side, respectively, up to each axial end of said cylinder.

3. An electromagnetic powder coupling device which utilizes forced air cooling comprising, a pair of brackets each rotatably receiving said drive shaft at an input side and an output side, respectively, a field member including a yoke and a coil assembly and being tightly received by said brackets, a hollow cylinder of magnetic material coaxially disposed in an inner space of said field member and supported by a pair of side plates each being disposed, respectively, at an input side and an output side so as to be integrally rotatable with said drive shaft, a rotor disposed coaxially around an axis of rotation and axially between said side plates, an annular magnetic flux shielding ring of non-magnetic material inserted through a central part of said cylinder for shielding magnetic flux from by-passing through said cylinder, magnetic powder being filled in a space between said cylinder and said rotor for effecting magnetic coupling between said cylinder and said rotor when said field member is excited and releasing said magnetic coupling when said field member is not excited, and a blower disposed at said output side axial end for blowing cooling air radially and slantedly outward to cool the periphery of said field member, a heat pipe axially laid adjacent to the outlet of said blower and radially at the inner side of said bracket at the output side and being provided with a plurality of fins attached on the outer surface of said heat pipe, a plurality of cooling fins disposed along the side wall of said side plate, a vent gate slantedly opening through the wall of said bracket at the output side, and a plurality of vent passages formed inside the radially outermost end of said output side bracket, wherein;

said bracket at the output side is formed as a double-walled type having an outer wall and an inner wall and the bracket at the input side is formed to have a plurality of exit vents at positions radially corresponding to said cylinder at the outer part of said rotor, and wherein a forced draft of air blown by said blower is introduced in and discharged outside by passing through three paths, a first path passing radially and slantedly outwards through the space between the outer wall and the inner wall of said double-walled bracket at the output side, a second path passing radially and slantedly outwards along the inner face of said double-walled bracket, and a third path which extends from the downstream part of the second path and passes axially through a vent passage defined between an outer surface of the cylinder and an inner surface of the field member and then flows outside through said exit vents such that the third path provides a cooling effect to a region adjacent to the coupling powder as forced air passes axially through the vent passage between the inner surface of the field member and the outer surface of the cylinder, wherein the inner surface of said field member includes a plurality of axially extending vent grooves passing from the output side to the input side to form said third path for said forced draft of the cooling air.

4. An electromagnetic powder coupling device as claimed in claim 3, wherein;

said outer wall and said inner wall of said double-walled bracket at the output side are both formed to slantedly extend radially outwardly and being in parallel with each other and the outermost peripheral end of said outer wall is axially bent inward so as to be laid over the outlet of said inner wall so that an annular outlet opening defined therebetween can be directed to the radially outer part of said field member.

* * * * *

UNITED STATES PATENT AND TRADEMARK OFFICE
CERTIFICATE OF CORRECTION

PATENT NO. : 5,178,582

DATED : January 12, 1993

INVENTOR(S) : Hiroshi Maji et al.

It is certified that error appears in the above-identified patent and that said Letters Patent is hereby corrected as shown below:

On the title page, Item [75],

The third inventor's name is spelled incorrectly, should be,

--Hidehisa Tsuji--.

Signed and Sealed this

Second Day of November, 1993

Attest:

BRUCE LEHMAN

Attesting Officer      Commissioner of Patents and Trademarks